US005218021A

United States Patent [19]

Clark et al.

[11] Patent Number: 5,218,021

[45] Date of Patent: Jun. 8, 1993

[54] COMPOSITIONS FOR POLAR SOLVENT FIRE FIGHTING CONTAINING PERFLUOROALKYL TERMINATED CO-OLIGOMER CONCENTRATES AND POLYSACCHARIDES

[75] Inventors: Kirtland P. Clark, Bethel, Conn.; Michael Jacobson, Greensboro, N.C.; Chang H. Jho, Dobbs Ferry, N.Y.

[73] Assignee: Ciba-Geigy Corporation, Ardsley, N.Y.

[21] Appl. No.: 832,150

[22] Filed: Feb. 6, 1992

Related U.S. Application Data

[63] Continuation-in-part of Ser. No. 722,633, Jun. 27, 1991, abandoned.

[51] Int. Cl.[5] .......... C08L 5/00; A62D 1/00

[52] U.S. Cl. .......... 524/56; 524/57; 524/58; 252/2; 252/3; 252/8.05

[58] Field of Search .......... 524/56, 57, 58; 252/2, 252/3, 8.05

[56] References Cited

U.S. PATENT DOCUMENTS

| | | | |
|---|---|---|---|
| 3,475,333 | 10/1969 | Meldrum et al. | 252/3 |
| 3,752,234 | 8/1973 | Degginer | 252/3 |
| 3,957,657 | 5/1976 | Chiesa, Jr. | 252/3 |
| 4,042,522 | 8/1977 | Falk | 252/8.05 |
| 4,060,132 | 11/1977 | Chisea | 252/3 |
| 4,060,489 | 11/1977 | Chisea | 252/2 |
| 4,303,534 | 12/1981 | Hisamoto et al. | 252/3 |
| 4,306,979 | 12/1981 | Tsuji | 252/3 |
| 4,387,032 | 6/1983 | Chiesa, Jr. | 252/3 |
| 4,420,434 | 12/1983 | Falk | 260/501.12 |
| 4,424,133 | 1/1984 | Mulligan | 252/8.05 |
| 4,459,213 | 7/1984 | Uchida et al. | 252/8.05 |
| 4,460,480 | 7/1984 | Kleiner et al. | 252/3 |
| 4,464,267 | 8/1984 | Chisea, Jr. et al. | 252/8.05 |
| 4,472,286 | 9/1984 | Falk | 252/3 |
| 4,536,298 | 8/1985 | Kamei et al. | 252/8.05 |
| 4,563,287 | 1/1986 | Hisamoto et al. | 252/2 |
| 4,717,744 | 1/1988 | Boutevin et al. | 524/17 |
| 4,859,349 | 8/1989 | Clark et al. | 252/8.05 |

FOREIGN PATENT DOCUMENTS

| | | |
|---|---|---|
| 0311570 | 4/1989 | European Pat. Off. . |
| 1245124 | 9/1971 | United Kingdom . |

OTHER PUBLICATIONS

Chemical Abstract No. 68-40612q.
Chem. Abst. 96:125645c.
Chem. Abst. 113:214907b.

*Primary Examiner*—Paul R. Michl
*Assistant Examiner*—Lavonda DeWitt
*Attorney, Agent, or Firm*—Kevin T. Mansfield; Edward McC. Roberts

[57] ABSTRACT

Co-oligmers of the formula $R_f—E_m—(S)_n—[M_1]_x—[M_2]_y—H$ and mixtures thereof, wherein $R_f$ is a perfluoroalkyl group, E is a linkage group, $M_1$ represents a nonionic hydrophilic monomer unit, $M_2$ represents an anionic hydrophilic monomer unit, n and m are optionally 0 or 1, and x and y represent the number of monomer units present in the novel co-oligomers, the sum of x and y being between 5 and 200, and $y/(x+y)$ being between 0.01 and 0.98; are useful as additives in polar-solvent fire-fighting compositions when used in conjunction with polysaccharides and other adjuvants. They improve dynamic foam stability and vapor suppressing ability of the foam, thereby reducing the flammability of polar solvent contaminated foams and consequently improving extinguishment and burnback resistance.

12 Claims, No Drawings

COMPOSITIONS FOR POLAR SOLVENT FIRE FIGHTING CONTAINING PERFLUOROALKYL TERMINATED CO-OLIGOMER CONCENTRATES AND POLYSACCHARIDES

CROSS-REFERENCE TO RELATED APPLICATION

This application is a continuation-in-part of application Ser. No. 07/722,633, filed Jun. 27, 1991 abandoned.

The instant invention relates to compositions suitable for fighting fires of hydrophilic or polar liquids which comprise the combination of $R_f$—substituted co-oligomers and polysaccharides.

BACKGROUND OF THE INVENTION

The instant invention relates to a new use of radical-terminated co-oligomers (hereafter called "co-oligomers"). These co-oligomers are composed of a backbone terminated by a perfluoroalkyl moiety from 8 to 1000 carbon atoms, wherein the backbone of the co-oligomer is made up of non-ionic hydrophilic monomer units and anionic hydrophilic monomer units. The instant invention describes the incorporation of these co-oligomers thereof into compositions for fire-fighting foams used on polar solvent fires. Similar co-oligomers have been disclosed for fire-fighting compositions in U.S. Pat. 4,460,480. However, these compositions are limited for use with protein and only for non-polar hydrocarbon fires.

Certain perfluorinated compounds have been used in fire-fighting foam compositions because of their well-known extreme surface activity in aqueous medium (now surface tension at very low concengtration) and oleophoibicity (hydrocarbon fuel repellency).

U.S. Pat. Nos. 3,475,333; 4,472,286; 4,460,480 and 4,717,744; French Pat. Nos. 2,007,254 and 2,010,842; and European Pat. No. 19,584 teach that non-ionic perfluoroalkyl surfactants are especially useful for fire-fighting compositions such as aqueous film forming foam concentrates (AFFF) and/or protein-based foam concentrates. These compounds are shown to improve the effectiveness of the fire-fighting foam concentrates by the improved foam quality, and reduced foam flammability.

The use of perfluoroalkyl oligomers and polymers is specifically taught in U.S. Pat. Nos. 3,475,333; 4,472,286; 4,460,480 and 4,717,744. A fire-extinguishing composition which includes them can form a thin aqueous film on the surface of a flammable liquid and inhibit the reignition of the flammable liquid once extinguished. Further, for instance, the said fire-fighting composition can enhance the physical properties such as heat resistance of the foam resulting therefrom. The perfluorinated surfactants in the aforementioned patents are also incorporated into protein-based fire-fighting compositions in order to impart improved properties such as increased foam mobility, reduced extinguishing times, and reduced fuel pick-up. U.S. Pat. No. 4,460,480 teaches co-oligomers, a process for their preparation and their use as a component in protein foam fire-fighting compositions for fighting fires of burning hydrophobic or non-polar hydrocarbon liquids.

These prior-art compositions suffer from the fact that they are useful only on hydrocarbon fires, and are ineffective on polar solvents or hydrophobic solvents which contain a small proportion of polar solvent, such as gasohol. These latter type solvents, especially those miscible with water, have proven difficult to extinguish because they are not effectively sealed by the foam that contains only the perfluoroalkyl surfactants previously disclosed.

U.S. Pat. Nos. 3,957,657; 4,420,434; 4,424,133; 4,387,032; 4,306,979; 4,060,489; 4,464,267 and 4,060,132 describe the use of thixotropic polysaccharide gums in fire-fighting compositions for polar solvent fires. Unlike other types of fire-fighting foams such as AFFF, such foams are not destroyed by the solvent, and are suitable to fight fires on polar solvents as well as on hydrocarbon solvents and fuels and on solids that are compatible with the foam. Fire-fighting foams containing polysaccharide gums form a membrane on the surface of the polar solvent that protects the rest of the foam from collapsing. The thixotropic character enables the ready pumping of the foam and of the solution from which it is foamed.

Protein hydrolysates can be used in combination with polysaccharide gums to fight polar-solvent fires. The use of non-oligomeric ampholytic sulphonamide fluorochemical with hydrolyzed protein and polysaccharide gums to fight polar solvent fires has been described in U.S. Pat. No. 4,424,133. In this invention, an anionic polysaccharide gum is added to a film-forming fluoroprotein to stabilize the foam in this composition.

U.S. Pat. Nos. 4,303,534 and 4,563,287 describe an aqueous fire-fighting composition based on a perfluoroalkyl, high molecular weight polymer (greater than 5,000 AMU, and preferably greater than 10,000 AMU) which contains perfluoroalkyl groups interspersed along the polymeric backbone. These polymers were found useful as additives in fire-fighting foams for polar solvents as well as on cooking oil fires. They suffer from the fact that the perfluoroalkyl groups are not as efficient when distributed randomly along the polymer backbone as in the present invention where the perfluoroalkyl groups terminate the said co-oligomers.

U.S. Pat. No. 4,859,349 discloses complexes of anionic polysaccharides with perfluoroalkyl cationic surfactants which are useful in aqueous fire fighting compositions for fighting polar solvent fires. The instant invention differs from this reference by teaching the use of anionic polysaccharides and anionic perfluoroalkyl co-oligomers for fighting fires on polar liquids. No co-oligomers are disclosed in U.S. Pat. No. 4,859,349.

The instant co-oligomers, by virtue of their structure, are capable of concentrating on the surface of water or at the interface between water and hydrocarbon fuel forming an oriented surface layer. The prior art polymers require high molecular weight to attain the efficiency which the co-oligomers of the present invention can attain at much lower atomic weight and fluorine levels. The dynamic foam stability in formulations prepared from the above type materials were found to be much weaker than those prepared from the co-oligomers of the present invention. The fire-fighting compositions prepared from these polymers did not incorporate polysaccharide gums into the compositions, and as a result were found to be much weaker in their ability to extinguish polar solvent fires than those compositions of the present invention.

It has now been surprisingly found that perfluoro-terminated co-oligomers made by reacting a perfluoroalkyl moiety with monomers of type $M_1$ and type $M_2$ are considerably more useful and efficient in prolonging the foam stability of polar solvent foam concentrates when used in conjunction with polysaccharides as well as other polymeric materials.

Most importantly, it was found that co-oligomers when incorporated into concentrates greatly improve the efficiency of said concentrates and impart superior performance characteristics to polar solvent fire-fighting foams. These co-oligomers exhibit superior performance to perfluoro-terminated homo-oligomers of the non-ionic hydrophilic type or perfluoro-terminated homo-oligomers of the anionic hydrophilic type described in the prior art. In the prior art, these homo-oligomers were disclosed as additives to protein foam designed for use only on non-polar solvent fires.

The present co-oligomers are also more soluble in salt water than the homo-oligomers previously disclosed as well as being less soluble in polar solvents, such as isopropyl alcohol and acetone. This makes the co-oligomers of the present invention much more effective and of practical importance.

The co-oligomers have been found to be extremely efficient vapor mitigators, and prolong the lifetime of the foam, because the foam blanket which is formed is impervious to vapor penetration. As vapor suppressants they prevent the reignition of polar solvents. The co-oligomers interact with polysaccharides in a synergistic manner, and improve the performance characteristics required for efficient vapor mitigation. The synergism was found to be due to strong association of co-oligomers with the polysaccharides. The co-oligomers were also found to strongly interact with polymers of several other types, including natural and synthetic polymers when used in conjunction with polysaccharides. The natural polymers can be neutral or anionic polysaccharide or proteins or combinations thereof. Likewise, the synthetic polymers can be neutral or anionic.

Other polar solvent fire-fighting compositions which do not incorporate thixotropic gums have also been described in U.S. Pat. Nos. 4,303,534; 4,060,132; 4,306,979 and 4,536,298.

European Pat. No. 19,584 describes the preparation of products of the type:

$$C_xF_{2x+1}—C_2H_4—S[CH_2CH(X)]_yH$$

where y can vary from four to 200 and X is particularly a —COOH or —$CONH_2$ group, formed by free-radical oligomerization of a thiol $C_xF_{2x+1}—C_2H_4—SH$ with a vinyl monomer such as, for example, acrylic acid or acrylamide.

U.S. Pat. No. 4,460,480 describes preparation and use of co-oligomers of the type:

$$R_f—E—S—[M_1]_x—[M_2]_y—H$$

and mixtures thereof wherein $R_f$ is a alkyl group, E is a linkage group, $M_1$ represent a hydrophilic monomer unit, $M_2$ represents a hydrophobic monomer unit, x and y represent the number of monomer units present in the co-oligomers. Both of these patents describe use of these co-oligomers for fighting non-polar hydrocarbon fires when used in aqueous film forming foam (AFFF) or fluoroprotein (FP). They were not described for use on polar solvent fires, nor for use in conjunction with polysaccharides.

Protein based fire-fighting compositions containing alkyl sulfide terminated oligomers are also described in U.S. Pat. No. 3,475,333 and British Pat. No. 1,245,124. These fluoroprotein foam compositions are also primarily designed for non-polar fuel fires and are not at all useful for fighting fires on polar solvents.

DETAILED DISCLOSURE

The present invention pertains to co-oligomers derived from perfluoroalkyl radicals and nonionic hydrophilic and anionic hydrophilic monomers via free radical co-oligomerization, and the use of such co-oligomers as additives to polar solvent fire-fighting compositions. It has been found that when small amounts of these co-oligomers are incorporated into fire-fighting concentrates which contain any of a variety of polymeric materials, superior foam properties are imparted to said concentrates, and that they are extremely effective when used on polar solvent fires.

When the foregoing concentrates are diluted with water, they are readily foamed to produce a very effective fire-fighting foam having an expansion ratio of 5 to 8. The majority of the foam, when applied to the burning polar solvent or liquid fuel does not break because of an impervious membrane or mat formed between the foam and the solvent. This membrane does not dissolve in such liquid rapidly enough to significantly diminish the spreading of the applied foam over the burning surface and the eventual extinguishment of the fire by the foam.

The formation of the aforementioned membrane involves precipitation of polar solvent-insoluble complexes formed between polymeric materials and the co-oligomer on the burning fuel surface. These dynamic interactions take place so rapidly that the foam bubbles are trapped in the membrane which subsequently floats on the fuel surface. This action takes place with about equal effectiveness when the diluting water is fresh water or salt water or any combination of these two waters, and the resulting pre-mixes have about the same fire-fighting effectiveness. The polar solvent fire-fighting compositions containing co-oligomers demonstrate excellent foam properties as measured by dynamic foam stability in the presence of solvent and resistance to solvent contamination.

Generally, the co-oligomers may be represented by the formula I $R_f—E_m—(S)_n—[M_1]_x—[M_2]_y—H$ (I) and mixtures thereof wherein $R_f$ is a straight or branched chain perfluoroalkyl of 1 to 20 carbon atoms;

E is a direct bond or a branched or straight chain alkylene of 2 to 20 carbon atoms or said alkylene interrupted by one to three moieties selected from the group consisting of —NR—, —O—, —S—, $SO_2$—, —COO—, —OOC—, —CONR—, —NRCO—, —$SO_2$NR—, and —$NRSO_2$—; or terminated at the $R_f$ end with —CONR— or —$SO_2$NR—, that is the $R_f$ is attached to the carbon or sulfur atom;

R is independently hydrogen, alkyl of 1 to 6 carbon atoms of hydroxyalkyl of 2 to 6 carbon atoms;

m and n are independently 0 or 1;

—$[M_1]$— represents a non-ionic hydrophilic monomer unit;

—$[M_2]$— represents an anionic-hydrophilic monomer unit; and x and y represent the number of monomer units present in the co-oligomers and are both greater than 0; the sum of x and y being between 5 and 200, and y/(x+y) being between 0.01 and 0.98.

It is understood that formula I is not intended to depict the actual sequence of the oligomer units since the units can be randomly distributed in the oligomer. It is also understood that the monomers from which —[$M_1$]— and —[$M_2$]— units are derived are known per se.

Non-ionic hydrophilic monomers of the type $M_1$ which contain at least one hydrophilic group are known per se and many are commercially available. Examples of such monomers are the derivatives of acrylic and methacrylic acids as well as maleic, fumaric and itaconic acids such as the hydroxyalkyl esters of acrylic acids e.g., 2-hydroxyethyl, 3-hydroxypropyl, 2-hydroxypropyl or 2,3-hydroxypropyl esters; also ethoxylated and polyethoxylated hydroxyalkyl esters, such as esters of alcohols of the formula:

$$HO-C_pH_{2p}-O-(CH_2CH_2O)_q-R_1$$

wherein $R_1$ represents hydrogen or methyl, p represents 2 to 5 and q represents 1 to 20 or esters of analogous alcohols, wherein a part of the ethylene oxide units is replaced by propylene oxide units. Further suitable esters are dialkylaminoalkyl acrylates and methacrylates, such as the 2-(dimethylamino)-ethyl-, 2-(diethylamino)-ethyl- and 3-(dimethylamino)-2-hydroxypropyl esters.

Another class of hydrophilic monomers are amides such as N-vinyl-pyrrolidone, acrylamide and methacrylamide as well as amides substituted by lower hydroxyalkyl, lower oxaalkyl- or lower dialkylaminoalkyl groups such as N-(hydroxymethyl)-acrylamide and methacrylamide, N-(3-hydroxypropyl)-acrylamide, N-(2-hydroxyethyl)-methacrylamide, N-(1,1-dimethyl-3-oxabutyl)-acrylamide and N-[1,1-dimethyl-2-(hydroxymethyl)-3-oxabutyl)]-acrylamide; methylol and ethers thereof, also ethoxylated and polyethoxylated hydroxyalkyl amides, such as amides of amines of the formula:

$$NH_2-C_pH_{2p}-(OCH_2CH_2)_q-NH_2$$

Vinyl esters with 1 to 6 carbons in the ester group, such as vinyl acetate, butyrate, laureate, stearate, 2-ethyl-hexanoate and benzoate; vinyl chloroacetate and isopropenyl acetate, vinyl carbonate derivatized are other useful monomers. The above listed non-ionic hydrophilic monomers of type $M_1$ can be used alone or in combination with each other as well as in combination with suitable anionic-hydrophilic monomers of type $M_2$.

Non-ionic hydrophilic monomers of type $M_1$ which require a comonomer for oligomerization are maleates, fumarates and vinyl ethers; the following monomer combinations are, for instance, useful; di(hydroxyalkyl) maleates, such as di(2-hydroxyethyl) maleate, and ethoxylated hydroxyalkyl maleates, hydroxyalkyl monomaleates, such as 2-hydroxyethyl monomaleate and hydroxylated hydroxyalkyl monomaleate with vinyl ethers, vinyl esters, styrene or generally any monomer which will easily co-oligomerize with maleates, fumarates; hydroxyalkyl vinyl ethers, such as 2-hydroxyethyl vinyl ether, 4-hydroxybutyl vinyl ether, with maleates, fumarates, or generally all monomers which will easily copolymerize with vinyl ethers.

Especially valuable non-ionic hydrophilic monomers of type $M_1$ are acrylamide, methacrylamide, diacetone acrylamide, and 2-hydroxyethyl methacrylate.

Anionic hydrophilic monomers of type $M_2$ which do co-oligomerize with hydrophilic monomers of type $M_1$ are known per se and include acrylic acid and methyacrylic acid and salts thereof, acrylamidopropane sulfonic acid and salts thereof, maleic, fumaric, muconic and itaconic acid and salts thereof as well as mono-olefinic sulfonic and phosphonic acids and their salts, such as sodium ethylene sulfonate, sodium styrene sulfonate and 2-acrylamido-2-methylpropane sulfonic acid.

It is well known to the one skilled in the art that mercaptans, alkyl halides and alkyl hydrocarbon halides act as so-called chain transfer agents in free-radical polymerization and copolymerization reactions. The previously listed non-ionic hydrophilic monomers of type $M_1$ and anionic hydrophilic monomers of type $M_2$ will either homo-oligomerize and/or co-oligomerize in the presence of a free-radical initiator and therefore readily react with the radicals forming the co-oligomers.

The co-oligomerization reaction is performed in an essentially water free reaction medium, preferably in a lower alcohol such as methanol, ethanol, isopropanol, or tert-butanol or a lower ketone such as acetone or a lower cellosolve which dissolve the reactants and catalyst.

Generally the co-oligomerization temperature is maintained at a temperature between 20° and 80° C., but temperatures up to 120° C. may be used as well. Optimum temperature may be readily determined for each oligomerization and will depend on the reaction, the relative reactivity of the monomers and the specific free-radical initiator used. In order to facilitate the free-radical propagation necessary for an effective catalyst reaction in an oxygen-free atmosphere is desirable and the co-oligomerizations are carried out under nitrogen.

The catalyst employed must be a free-radical initiator, such as peroxides, persulfates or azo compounds. These materials are well known in the art. However, particularly efficacious results are obtained using organic peroxides, azo catalysts and water soluble persulfates. Specific examples include ammonium persulfates, lauroyl peroxide, tert-butyl peroxide and particularly the azo catalysts 2,2'-azo-bis-(isobutylnitrile); 2,2'-azo-bis-(2,4-dimethylvaleronitrile); 2-tert-butylazo-2-cyanopropane; 1-tert-butylazo-1-cyanocyclohexane; and 2,2'-azo-bis-(2,4-dimethyl-4-methoxyvaleronitrile).

Catalytic amounts of initiator are used, that is between 0.01 and 0.5% by weight of the monomers depending on the particular initiator and monomer system. With the preferred azo catalyst from 0.01 to 0.2% by weight of azo catalyst per weight of monomers are used. Using greater amounts of initiators provides no significant advantage.

It is most practical to synthesize the co-oligomers from monomers of type $M_1$ and $M_2$ in a one step co-oligomerization reaction as previously outlined. However, it is also possible, and under certain circumstances necessary, to synthesize the co-oligomers in a two step synthesis. In this alternate synthesis method, hydrolyzable hydrophilic or hydrophobic monomers of type $M_1$ are oligomerized in the presence of the radical terminator yielding a radical terminated co-oligomer containing $M_1$ monomer units. In a second step, such co-oligomers are hydrolyzed with a base, preferably alcoholic sodium or potassium hydroxide solution. In this hydrolysis process, selected $M_1$ monomer units are converted into anionic hydrophilic $M_2$ monomer units. In this way, vinyl acetate monomer units are converted into vinyl alcohol monomer units or acrlyamide or acrylate units are converted into acrylic acid units.

Similarly, co-oligomers containing maleic anhydride monomer units can be hydrolyzed or amidized. This two step approach is, however, more costly than the one step synthesis approach which is preferred and made possible due to the commercial availability of a large number of hydrophilic monomers of type $M_1$.

In order to synthesize the radical terminated co-oligomer of formula I having the most desirable properties as a foam additive, it is necessary to balance the oleophobic and hydrophobic properties of the $R_f$—$E_m$—$(S)_n$— segment versus the hydrophilic properties of the $M_1$ monomer units and the hydrophilic properties of the $M_2$ monomer units in the co-oligomer. In order to achieve a desired balance of properties it is advantageous to have more than one type of $M_1$ units and more than one type of $M_2$ units present in the co-oligomer.

Further, by proper selection of the alkyl terminating radical, it is possible to achieve the desired hydrophobic/hydrophilic balance required in a given co-oligomer. A higher alkyl group confers a higher degree of hydrophobicity to a given co-oligomer, and therefore requires a greater amount of hydrophilic character with the said co-oligomer to achieve the desired balance.

By examining the nature of the ratio of the $M_1$ and $M_2$ monomer units it was found that the dynamic foam stability of the mixtures containing the described co-oligomers, can be modified. In addition to the ability of the artisan to use the co-oligomers of the invention to extend the foam stability for polar solvent fire fighting foams, the instant compositions can be tailored in such a way as to provide improved extinguishing times and the least sensitivity to solvent pickup with a given concentrate.

For most applications of the radical terminated co-oligomers it was found desirable to achieve a solubility in water or water-solvent mixtures of at least 0.1% by weight of co-oligomer. These very small amounts of co-oligomers have significant effect when used in combination with the appropriate polymeric materials described above.

Co-oligomers of formula I can be prepared from a variety of fluorinated compounds of formula II $$R_f—E_m—S_n—X \quad (II)$$

where X is hydrogen or halogen, such as chlorine, bromine or iodine, and $R_f$, E, m and n are as defined above and a vast number of commercially available monomers of type $M_1$ and $M_2$ as defined previously. It was found, however, that certain radicals and monomers are preferred either because of availability or ease of synthesis and most importantly because of performance characteristics.

Preferred co-oligomers of formula I are those where $R_f$ is a linear or branched perfluoroalkyl group with 6 to 20 carbon atoms, E is alkylene of 2 to 6 carbon atoms, preferably ethylene, m is 0 or 1, n is 0 or 1;

—[$M_1$]— is —[$CH_2CT_1R_1$]—, —[$CH_2CHT_2$]— or —[$CHT_3CHT_4$]— wherein $T_1$ is —$CONH_2$; —$CONHR_2$; —$CONHR_3$; —$CONHCH_2OH$; —$CONHCH_2OR_2$; —$CONHE_2OH$; —$CO(OE_1)_qOR_1$; —$COOCH_2CHOHCH_2OH$; —CONH—$E_2$—$SO_3Z$; or —$CON(E_1OH)_2$;

$T_2$ is —OH; —$OE_2OR_1$; —$(OE_1)_qOR_1$; —$SO_3Z$; —$C_6H_4SO_3Z$; 2-oxo-pyrrolino; or —$NHCOR_1$;

$T_3$ and $T_4$ are independently —COOZ; —$CONH_2$; —$CO(OE_1)_qOR_1$; —CONH—$E_1$—OH; or —CON($E_1$—OH$)_2$;

$R_1$ is hydrogen or methyl;

$R_2$ and $R_3$ are independently alkyl with 1 to 6 carbon atoms;

$E_1$ is alkylene with 2 or 3 carbon atoms;

$E_2$ is alkylene with 2 to 6 carbon atoms;

Z is hydrogen or an alkali metal;

q is 1 to 20;

—[$M_2$]— is —[$CH_2CR_1G_1$]— or —[$CHG_2CHG_3$]— wherein $G_1$ is —COOH, $E_2$—$SO_3H$ or $E_2$—$PO_3H_2$;

$G_2$ and $G_3$ are independently alkylene with 1 to 6 carbon atoms terminated by —COOH;

$R_1$ is as previously defined;

the sum of (x+y) is 5 to 200;

y/(x+y) is 0.01 to 0.98;

x is 4 to 198; and y is 1 to 196.

More preferably, the co-oligomers of formula I are those wherein $R_f$ is a linear alkyl with 8 to 20 carbon atoms;

E is ethylene;

—[$M_1$]— is —[$CH_2CT_1R_1$]—, —[$CH_2CHT_2$]— or —[$CHT_3CHT_4$]— wherein $T_1$ is —$CONH_2$; $CONHR_2$; —$CONHR_3$; —$CONHCH_2OH$; —$CONHCH_2OR_2$; —$CONHE_2OH$; —$COOCH_2CHOHCH_2OH$; —CONH—$E_2$—$SO_3Z$; —$CO(OE_1)_qOR_1$; or —$COOCH_2CHOHCH_2OH$;

$T_2$ is —OH; —$OE_2OR_1$; —$(OE_1)_qOR_1$; —$SO_3Z$; —$C_6H_4SO_3Z$; 2-oxo-pyrrolino; or —$NHCOR_1$;

$T_3$ and $T_4$ are independently —COOZ; —$CONH_2$; —$CO(OE_1)_qOR_1$; —CONH—$E_1$—OH; or —CON($E_1$—OH$)_2$;

—[$M_2$]— is —[$CH_2CR_1G_1$]— or —[$CHG_2CHG_3$]— wherein $G_1$ is —COOH, —$E_2$—$SO_3H$ or $E_2$—$PO_3H_2$;

$G_2$ and $G_3$ are independently alkylene with 1 to 6 carbons terminated by —COOH; m, n, $R_1$, $R_2$, $R_3$, $E_1$, $E_2$, Z and q are as previously defined; the sum of x+y is 12 to 100; y/(x+y) is 0.05 to 0.9; x is 10 to 95; and y is 2 to 90.

The most preferred co-oligomers of formula I are those wherein $R_f$ is a linear perfluoroalkyl of 8 to 20 carbon atoms; the sum of x+y is 28 to 75; y/(x+y) is 0.1 to 0.5; x is 25 to 68; y is 3 to 35; E is ethylene; m and n are 0 or 1;

—[$M_1$]— is —[$CH_2CT_1R_1$]—, —[$CH_2CHT_2$]— or —[$CHT_3CHT_4$]— wherein $T_1$ is —$CONH_2$; —$CONHR_2$; —$CONHR_3$; —$CONHCH_2OR_2$; —$CONHE_2OH$; —$COOCH_2CHOHCH_2OH$; —$CO(OE_1)_qOR_1$ or —$COOCH_2CHOHCH_2OH$;

—[$M_2$]— is —[$CH_2CR_1G_1$]— or —[$CHG_2CHG_3$]— wherein $G_1$ is —COOH or —$E_2$—$SO_3H$; $G_2$ and $G_3$ are independently alkylene with 1 to 6 carbon atoms terminated by —COOH; and $T_2$, $T_3$, $T_4$, $R_1$, $R_2$, $R_3$, $E_1$, $E_2$, Z and q are as defined previously.

A very preferred embodiment of the instant invention is a co-oligomer of formula I where $R_f$ is perfluoroalkyl of 6 to 20 carbon atoms, E is ethylene, m and n are each 1, —[$M_1$]— is —[$CH_2CHT_1$]— where $T_1$—$CONH_2$, —[$M_2$]— is —[$CH_2CHG_1$]— where $G_1$ is —COOH, x+y is 21 to 44, and y/(x+y) is 0.2 to 0.3.

The co-oligomers are particularly useful when used in combination with polysaccharides as additives to foam concentrates used for polar solvent fires. Such polar solvent or alcohol resistant foam concentrates (ARFCs) containing the co-oligomers show outstanding dynamic foam stability. Here the dynamic foam stability is defined as the stability of the foam in the presence of a solvent or fuel. A laboratory procedure for the measurement of this stability will be discussed in detail in the experimental section.

The co-oligomers were also found to greatly enhance or improve the stability of alcohol resistant film-forming fluoroprotein foam concentrates containing polysaccharide gums (AR-FFFPs). These formulations were found to be superior to those AR-FFFPs which utilize non-oligomeric fluorochemicals. As a result, such foams do control and extinguish difficult to fight polar solvent fuel fires forming a secure and long lasting foam blanket which suppresses the release of flammable vapors. The foams have great stability and heat resistance, provide effective sealing against hot tank walls and hence high resistance to reignition and burn back.

Other factors distinguishing superior compositions are the extinguishment of rim fires, smoothness of the foam blanket and minimal charring characteristics. The subject co-oligomers confer these outstanding properties on polar solvent fire extinguishing agents. Such foam concentrates containing co-oligomers can be proportioned (diluted) directly with fresh or salt water and show excellent long term stability.

Polar solvent resistant foam agents are available as concentrates for either 3% or 6% proportioning. This means that when these concentrates are used, the 3% concentrate is mixed with fresh or salt water in a ratio of 3 volumes of concentrate to 97 volumes of water. Similarly, the 6% concentrate is mixed with fresh or salt water in a ratio of 6 volumes of concentrate to 94 volumes of water. Thus the subject co-oligomers are incorporated in a 3% type concentrate in amounts varying from about 0.1% to about 20%.

Similarly, the co-oligomers are incorporated into a 6% type concentrate in amounts varying from about 0.05% to 10%. The actual amount depends upon the effects desired.

The co-oligomers of this invention are synthesized by reacting a hydrophilic monomer or monomers of the type M1 with or without a hydrophilic monomer or monomers of the type M2 in the presence of a mercaptan of formula II. Perfluorinated mercaptans of formula II are described inter alia in U.S. Pat. Nos. 2,894,991; 2,961,470; 2,965,677; 3,088,849; 3,172,910; 3,554,663; 3,655,732; 3,686,283; 3,883,596; 3,886,201, and 3,935,277; and Australian Application No. 36868; filed Apr. 24, 1968. The pertinent parts of these patents are incorporated herein by reference.

Polysaccharides and other Polymers Utilized in Polar Solvent Fire Fighting Compositions Anionic polysaccharide gums belong to a known class of materials and are described, for example, in Vol. 11 (2nd edition), pp. 396–424; and Vol. 15 (3rd edition), pp. 439–445 of Kirk-Othmer Encyclopedia of Chemical Technology (John Wiley and Sons), N.Y. Anionic polysaccharide gums for the present invention are those containing carboxyl, sulfonic, sulfato, phosphonic, or phosphato anionic groups.

The carboxyl groups in naturally occurring anionic polysaccharide gums are frequently derived from D-glucuronic acid, as in pectic acid, which is a linear polymer of the acid. Alginic acid is a copolymer of mannuronic acid and guluronic acids; dermaten contains L-iduronic acid; heparin contains sulfated hydroxyl groups.

Microbial polysaccharide gums are produced extracellularly by microorganisms grown under rigidly controlled conditions. The anionic heteropolysaccharide gums grown from Xanthomonas campestris is called xanthan gum; it contains ionizable carboxyl groups from D-glucuronic acid residues as well as a pyruvic acid content. It is believed that the final product is actually a mixture of high and low pyruvate types since different acid contents can be obtained from fractional precipitation in alcohol. Xanthan gums typically contain pyruvate acetals whose content is sensitive to variant substrains of the Xanthamonas campestris culture. Moreover, dispersions of gum with 4–4.8% pyruvate are more viscous than gum of 2.5–3.0% and the strains and fermentation conditions must be carefully controlled.

Trade names of some of these gums are RHODOPOL, KELCO, KELTROL, ACTIGUM, CECALGUM, GALAXY and KELZAN. The structure of many gums has not been determined and is not critical for the purposes of this invention. It merely suffices that the acidic residues are present in the gum.

Gums and substances useful for the purposes of this invention, which have acidic residues, are: xanthan gum, pectic acid, alginic acid, agar, carrageenan gum, rhamsam gum, welan gum, mannan gum, phosphamannan Y2448, locust bean gum, galactomannan gum, KELCO K8A13, pectin, starch, ZANFLO, beijerinckia indica, bacterial alginic acid, succinoglucan, gum arabic, carboxymethylcellulose, heparin, phosphoric acid polysaccharide gums, dextran sulfate, dermatan sulfate, fucan sulfate, gum karaya, gum tragacanth and sulfated locust bean gum.

The polysaccharide gums are considered anionic if they contain as little as 0.5% by weight carboxyl groups or equivalent acid function, e.g. sulfato, sulfanato, or phosphato. They should be soluble in water at 0.01% by weight and contain ten or more monosaccharide residues.

Neutral polysaccharides were surprisingly found to be effective as additives to the anionic polysaccharide gums for the present invention. Various neutral polysaccharide include cellulose, hydroxyethyl cellulose, dextran and modified dextrans, neutral glucans hydroxypropyl cellulose as well as other cellulose ethers and esters. Starches and modified starches have also proven to be useful additives. Modified starches include starch esters, ethers, oxidized starches, and enzymatically digested starches.

The neutral polysaccharide can be substituted up to a 75% per weight basis of the anionic polysaccharide gums without experiencing a significant deleterious effect in foam performance. These neutral polysaccharide gums are not thixotropic, and have the virtue of greatly reducing the viscosities of the fire-fighting formulations while retaining the desired performance.

Hydrolysed proteins for use in fire-fighting compositions are well known. They are made by hydrolysing substances such as keratin and albumins which are found in animal hooves, horns, feathers and blood. They are employed as aqueous compositions (bases) which often contain one or more additives as stabilizers, preservatives and complexing agents, e.g. iron salts, zinc salts, sodium citrate and sodium chloride, all of which are known additives to improve solution stability and fire-fighting properties such as foam stability, heat resistance and foam drainage.

The hydrolyzed protein bases employed in the present invention usually have a pH of less than 9, e.g. from 6 to 8. The amount of hydrolyzed protein present in the composition as applied to a fire suitably is in the range of from 0.3 to 3.0 parts by weight (solids) per 100 parts by weight of composition. In the concentrate form of the composition the amount of hydrolyzed protein base may be present, for example, from 30 to 90 percent of the concentrate, and the concentration of the hydrolyzed protein in the hydrolyzed protein base may be, for example, 20 to 25% weight.volume in a 6% concentrate, and from 35 to 45% weight/volume in a 3% concentrate.

Protein hydrolysates produced commercially include AER-O-FOAM (Chubb-National), LORCON, NICEROL (Angus) and PROFOAM (Croda-Kerr) to name a few.

Synthetic polymers can also be employed in the present invention. The polymers can be neutral or ionic in nature and are usually formulated to have a pH of less than 9, e.g. from 6 to 8. The amount of polymer present in the composition as applied to a fire suitably is in the range of from 0.3 to 3.0 parts by weight (solids) per 100 parts by weight of composition. The synthetic polymers used can be of the following classes, or mixtures thereof: polyureas, polyacetates, polyalcohols, polyethers, and polyurethanes.

Likewise the synthetic polymers used can be of the following classes, or combinations thereof; polyacetals, polyamides, polyesters, polyetherketones, polyimides and polyisocyanates. Examples are poly(vinyl alcohol), hydroxyethyl cellulose and the like.

Other ingredients which are usually employed in fire-fighting compositions may be employed in the composition of this invention. Examples of such ingredients are freezing-point depressants such as ethylene glycol and preservatives such as that available under the trade name DOWICIDE (Dow).

Another embodiment of the present invention relates to compositions containing co-oligomers that form polar solvent-insoluble membrane with polymeric materials. Such compositions characteristically also contain conventional aqueous foam adjuvants. Typical foam adjuvants include one or more of the following: surfactant, surfactant synergist, solvent, electrolyte, and polymeric material.

Preferred concentrates based on the novel co-oligomer/polymer complexes useful for polar solvent fire-fighting compositions comprise the following components, number A through K A. 0.1 to 10% by weight co-oligomer;

B. 0 to 5% by weight of $R_fR_f$ ion-pair complex of the type described in U.S. Pat. No. 4,420,434;

C. 0 to 25% by weight of nonionic, amphoteric, anionic or cationic fluorochemical surfactants;

D. 0 to 5% by weight of a fluorochemical synergist;

E. 0 to 40% by weight of nonionic, amphoteric, or anionic hydrocarbon surfactant;

F. 0 to 40% by weight of a water miscible solvent;

G. 0 to 5% by weight of an electrolyte;

H. 0.01 to 10% by weight of a polysaccharide;

I. 0 to 4% by weight of fluorinated homo-oligomers as described in U.S. Pat. No. 4,460,480;

J. 0 to 50% of protein or other natural or synthetic polymer;

K. Water in the amount to make up the balance of 100%.

Each compound A through J may consist of a specific compound or mixtures of compounds.

The following examples are illustrative of various representative embodiments of the invention, and are not to be interpreted as limiting the scope of the appended claims. In the examples all parts are by weight unless otherwise specified.

Synthesis of Co-oligomers $R_f$ is understood to represent a mixture of perfluoroalkyl homologs ranging from $C_6$ to $C_{20}$.

A typical $R_f$ perfluoroalkyl group useful in the instant invention has a molecular weight of about 687 and the following distribution of $R_f$ moieties.

| $R_f$ | % by weight of total $R_f$ |
|---|---|
| $C_6F_{13}$ | 1 |
| $C_8F_{17}$ | 9 |
| $C_{10}F_{21}$ | 26 |
| $C_{12}F_{25}$ | 29 |
| $C_{14}F_{29}$ | 20 |
| $C_{16}F_{33}$ | 10 |
| $C_{18}F_{37}$ | 4 |
| $C_{20}F_{41}$ | 1 |

Examples 1 to 5 illustrate the methods of preparation of the instant co-oligomers. The preparation of the co-oligomers is straightforward and reaction occurs readily in the absence of oxygen as evidenced by the appearance of solid which precipitates within a few hours in many cases. Co-oligomers are characterized directly using HPLC (high performance liquid chromatography) and HPLC/MS (high performance liquid chromatography and mass spectrometry) techniques. Product formation is confirmed also by complete disappearance of the radical terminator as measured by TLC (thin layer chromatography) and/or GC (gas chromatography). Co-oligomers are characterized by their water solubility, aqueous surface tension reduction capabilities, and their effect upon polar fire-fighting mixture compositions. The structures indicated for the oligomer showing single values for m, n, x, and/or y are idealized. HPLC analysis shows such products to be composed of a distribution of compositions centered about the single value of x+y. The monomer subunits are distributed in random fashion along the co-oligomeric backbone and no specific sequence of these monomers is implied.

EXAMPLE 1

To a 4 liter reactor is charged 0.33 Kgs. of tert-butyl alcohol in which 0.06 g of 2,2'azobis(2,4-dimethylvaleronitrile)(Vazo 52) is dissolved. The solution is then heated for 30 minutes at 82° C. Then simultaneously two reactor streams are fed into the mixture. One stream contains 0.32 Kgs. of acrylamide comixed with 0.08 Kgs. of acrylic acid in 0.33 Kgs. of tert-butyl alcohol (4 mol. acrylamide per mol. acrylic acid). The other stream contains 0.18 Kgs. of $R_fCH_2CH_2SH$[M.W.=680], 0.42 Kgs. of butyl carbitol and 0.6 g of Vazo 52. These reactant ratios correspond to 1 mole of $R_fCH_2CH_2SH$ to 17 moles of acrylamide and 4 moles of acrylic acid. After 10 minutes a white precipitate is observed. The two streams are added to the reactor over a period of 4.5 hours at 82' C. resulting in a continuous formation of co-oligomeric product while permitting safe, complete control of the exothermic oligomerization. At the end of the addition period, the reaction mixture is held for another four hours at 58°–63° C. while an additional charge of 0.06 g of Vazo 52 in tert-butanol is added. Following reaction period, the tert-butanol solvent is removed by distillation. Once collection of the distillate is minimal, butyl carbitol (0.6 Kg) is added to the reactor. Distillation is continued until no more tert-butanol distillate is collected. The final product is obtained as a white crystalline material. The product is diluted to 20% actives with water, resulting in a clear solution suitable for use as an additive in fire-fighting compositions.

High pressure liquid chromatography (HPLC) analysis of the product, using ultraviolet (UV, 215 nm) detection and gradient, reversed phase elution techniques shows the presence of a distribution of products under an envelope.

Consumption of acrylamide and acrylic acid monomers is confirmed, again by HPLC analysis of the product using UV detection and gradient elution techniques.

EXAMPLES 2–6

Using the general procedure of Example 1, additional samples of single tailed perfluoroalkyl-terminated co-oligomers are prepared by varying the x and y values and varying the y/(x+y) ratio.

TABLE I

Perfluorinated Co-oligomers Used in Laboratory and Fire Test Evaluations

| Example No. | x + y | y/(x + y) |
|---|---|---|
| 1 | 21 | 0.2 |
| 2 | 28 | 0.2 |
| 3 | 30 | 0.2 |
| 4 | 36 | 0.2 |
| 5 | 44 | 0.2 |
| 6 | 31 | 0.3 |

Laboratory Tests for Fire-fighting Performance on Polar Solvents

1. Dynamic Foam Stability Test

Fire fighting compositions for polar solvents generally contain polymeric materials that form a membrane on the surface of a polar solvent. It is this membrane which prevents the foam from getting rapidly dissolved into the solvent and consequently being destroyed. Because of this direct interaction between the polar solvent and the foam, the conventional laboratory foam quality test of Foam Expansion Ratio (FXR) and Quarter Drain Time (QDT), which many fire-fighting foam agent specifications such as UL 162 require, do not provide a realistic measure of foam quality of the polar-solvent compositions. These static foam qualities are generally well accepted as important properties of the fire-fighting compositions for non-polar solvents and fuels such as AFFFs and fluoroproteins.

In an effort to simulate the dynamic flow conditions and the direct interaction between the foam and the polar solvent fuel in a field test situation (as specified in UL 162), a dynamic foam stability test was devised. In this test, foam is applied indirectly to the polar solvent through a guide tube and allowed to slide across the surface of the solvent. This lab test is much akin to the UL fire test where the foam is indirectly discharged to the fuel through a backboard and allowed to spread and fight the fire.

The procedure for the dynamic foam stability ("Foam Life") test on a polar solvent is as follows:

A 75 ml sample of an appropriate premix solution (3 or 6% dilution of a polar fire-fighting composition) is loaded into the foam generator. The foam is discharged through a glass guide tube onto 250 ml of isopropyl alcohol or acetone held in a 25 cm×16 cm glass pan. The foam is applied through the guide tube in such a way that it spreads over and across the solvent from one end of the pan to the other and completely covers the surface of the solvent. The time required for 50% of the foam area to collapse from the moment the foam touches the solvent is recorded. This value is termed the "Foam Life (FL)". This is the most realistic laboratory measurement of foam stability under dynamic conditions in the presence of a solvent.

The foams of fire fighting compositions which are not designed for polar solvents such as AFFFs and fluoroproteins are destroyed instantly when they come in contact with such a water-miscible polar solvent as isopropyl alcohol and acetone.

2. Fire-Fighting Compositions for the Evaluation of Co-oligomers

The effectiveness of the instant co-oligomers is determined in the dynamic foam stability test as described above as well as in actual fire tests. The following base fire-fighting foam compositions are prepared for these tests.

2.1. Polar-solvent or Alcohol Resistant Foam Compositions (ARFCs)

Three base polar-solvent compositions (for 6% proportioning) containing the components B through I described above are used; they are designated ARFC-1 and ARFC-2. All of the base formulations have the same compositions except for the component H; ARFC-1 contains polysaccharides, i.e. xanthan gums, whereas ARFC-2 contains a neutral polysaccharide, hydroxyethyl cellulose(HEC). The base compositions used for a typical homo-oligomer described in U.S. Pat. No. 4,460,480 contain a different combination of the components B through I from the above ARFC compositions. Both isopropanol and acetone are used as a representative polar solvent.

2.2. Alcohol Resistant Film Forming Fluoroprotein Compositions (AR-FFFPs)

To test the effectiveness of the instant co-oligomers in protein-based polar-solvent concentrates, two base compositions (for 6% proportioning), AR-FFFP1 and AR-FFFP2, are used. The AR-FFFP1 samples, with and without the co-oligomers, are prepared in the lab using a commercial protein base from Canada and components C and F described above. AR-FFFP2 is a commercial product from England. Both AR-FFFP1 and AR-FFFP2 contain a polysaccharide (xanthan gum). These types of products are known as 3 or 6% agents because they are used on non-polar solvents at 3% proportioning and polar solvents at 3% proportioning.

3. Association of Perfluorinated Co-oligomers with Polymeric Materials

In an effort to understand the mechanism by which the co-oligomers of this invention improve the dynamic foam stability of polar fire-fighting concentrates, the polar-solvent insoluble materials that precipitate out to form the foam-stabilizing membrane are compared in ARFC-1 with and without the co-oligomer in the following experiment:

A 10 gram sample of ARFC-1 containing 1% anionic polysaccharide gum is dissolved in distilled water to make a 140 ml solution. This solution is slowly added to 600 ml polar solvent (both isopropanol and acetone are used) under constant stirring. The polar-solvent insoluble polysaccharide gum that precipitates out in the solvent is collected on a filter paper (Whatman #41) and thoroughly washed with the solvent to remove all the surfactants off the polysaccharide gum precipitate. The polar-solvent insolubles thus collected are dried in a draft oven (35° C.) to a constant weight.

4. Fire Test

The effectiveness of the instant co-oligomers as an additive to the polar-solvent composition, ARFC-1, is confirmed in fire tests carried out according to the UL 162 Standard. A modified UL 162 test configuration is used on the protein-based polar-solvent compositions, AR-FFFP1, with and without the co-oligomers.

Table II shows the dramatic effects the co-oligomers have on the dynamic foam stability (Foam Life) of a polar solvent composition which contains an anionic polysaccharide gum. Here as well as in the rest of the tables the level of example co-oligomers used in the experiments is in percent "actives" by weight. The effectiveness of different instant co-oligomers is compared all at the same level of fluorine.

Without the co-oligomer present, the foam lasts for only 5 minutes, whereas with a small amount of co-oligomer (0.35% "actives" in the concentrate) the foam lasts for 55 minutes, a more than a ten-fold increase in effectiveness for the instant compositions. This table also shows that at the same fluorine level the co-oligomer stabilizes the foam three times longer than does the corresponding homo-oligomer which is disclosed in the prior art (U.S. Pat. No. 4,460,480).

TABLE II

Comparison of Dynamic Foam Stabilization Effect of Homo-oligomers and Co-oligomers in Polar Solvent Composition ARFC-1 on Isopropanol (6% Salt Water Premix)

| ARFC-1 with | Foam Life (minutes) |
|---|---|
| Blank[a] | 5 |
| Oligomer[b] (@ 0.37%) | 21 |
| Co-oligomer of Example 2 (@ 0.35%) | 55 |
| Co-oligomer of Example 6 (@ 0.38%) | 50 |

[a]Base composition ARFC-1 without co-oligomer.
[b]A homo-oligomer as described in U.S. Pat. No. 4,460,480 and 4,859,349.

The effectiveness of the co-oligomers with differing lengths of hydrophilic moiety, x+y, is compared at a fixed fluorine level on hot isopropanol and acetone in Table III. This table shows that there is a size requirement of the hydrophilic moiety for optimum performance, and this requirement depends on the premix medium (salt or fresh water) and the type of polar solvent. This suggests that co-oligomers can be tailor-made to meet specific performance requirements.

TABLE III

Dynamic Foam Stabilization Effect of Perfluorinated Co-oligomers with Different x + y Values in AFRC-1

| Co-oligomer[a] of Example | x + y | Foam Life (min)[b] 6% salt | Foam Life (min)[b] 3% fresh | Foam Life (min)[c] 6% salt | Foam Life (min)[c] 3% fresh |
|---|---|---|---|---|---|
| 1 | 21 | 12.5 | 2.2 | >100 | 45 |
| 2 | 28 | 17.0 | 1.5 | — | — |
| 4 | 36 | 14.0 | 1.5 | 60 | 40 |
| 5 | 44 | 14.0 | 3.5 | >100 | 50 |
| 6 | 31 | 10.0 | — | 13 | — |

[a]All the co-oligomers are compared at a fixed fluorine concentration of 0.065%.
[b]on isopropanol at 70° C.
[c]on acetone at 50° C.

Table IV shows the effect of the co-oligomer concentration on the Foam Life on isopropanol (IPA) and acetone. The Foam Life increases linearly as a function of the co-oligomer concentration and seems to level off slowly at a high concentration.

TABLE IV

Dynamic Foam Stabilization Effect of Perfluorinated Co-oligomers in Polar Solvent Composition ARFC-1 (6% Salt Water Premix)

| ARFC-1 with | Level of Co-oligomer (%) | Foam Life (minutes) Isopropanol | Foam Life (minutes) Acetone |
|---|---|---|---|
| Blank[a] | 0 | 5 | 10 |
| co-oligomer of Example 2 | 0.088 | 27 | 40 |
| | 0.176 | 40 | 60 |
| | 0.352 | 55 | 82 |
| | 0.528 | 74 | 100 |
| | 0.704 | 80 | >100 |

[a]Base composition ARFC-1 without co-oligomer.

Dramatic improvement of dynamic foam stability of the protein-based polar-solvent compositions (AR-FFFP2) by the co-oligomer is also demonstrated in Table V. A three- to four-fold improvement in the foam stability is obtained on both room temperature (RT) and "hot" isopropanol. On "hot" acetone more than a sixty-fold improvement is observed.

TABLE V

Dynamic Foam Stabilization Effect of Perfluorinated Co-oligomers in Alcohol Resistant Film Forming Fluoroprotein Concentrates (AR-FFFP) (6% Salt Water Premix Solution)

| Formulation | Foam Life (minutes) Isopropanol RT | Isopropanol hot (70° C.) | Acetone RT | Acetone hot (50° C.) |
|---|---|---|---|---|
| AR-FFFP2 | 15.5 | 3.7 | >60 | 3.0 |
| AR-FFFP2 with co-oligomer of Example 3 (@ 0.42%)[a] | 50.0 | 16.0 | >60 | >60 |

[a]0.42% of co-oligomer is added to AR-FFFP2.

The example co-oligomers are also found to interact synergistically with a neutral polysaccharide, hydroxyethyl cellulose (HEC), as evidenced by the greatly improved Foam Life as seen in Table VI.

TABLE VI

Dynamic Foam Stabilization Effect of Perfluorinated Co-oligomers in Polar-solvent Composition Containing Hydroxyethyl Cellulose (HEC) (ARFC-2) (6% Salt Water Premix)

| ARFC-2 containing | Foam Life (minutes) Isopropanol | Foam Life (minutes) Acetone |
|---|---|---|
| HEC[a] alone | 1 | 0.3 |
| HEC[a] + co-oligomer of Example 3 (0.37%) | 8 | 3 |

[a]HEC (CELLOSIZE WP-09-L) from Union Carbide.

Tables VII through X summarize the results of the fire tests carried out according to the UL 162 and modified UL test protocol. These data correlate with the laboratory results of the dynamic foam stability tests which predicted superior fire performance of the co-oligomer-containing compositions as compared to compositions containing no co-oligomers ("blank"). In the case of the "synthetic" alcohol resistant foam (ARFC-1), drastic improvement in both the control (CT)/extinguishment (XT) times and burnback resistance is obtained on isopropanol with the co-oligomers (Table VII). On acetone, for example, extinguishment is not possible without the co-oligomers (Table VIII).

The same degree of fire performance improvement by the co-oligomers is also demonstrated with the protein-based alcohol resistant foam concentrate AR-FFFP1 (Tables IX and X). Without the co-oligomer, this formulation does not even meet the extinguishment and burnback requirements of UL 162. The last table (Table XI) clearly shows that there are adsorptive interactions between co-oligomer and polysaccharide gum. With the blank almost the same amount of polysaccharide gum that is contained in the formulation is recovered as expected (1.0% vs 1.1%). However, in the presence of co-oligomer the amount of insolubles is about 30% greater than the expected amount solely from the polysaccharide gum (1.1% vs 1.4%), which indicates strong adsorption of co-oligomer onto the polysaccharide gum. This strong adsorption of the negatively charged co-oligomer molecules onto an anionic polysaccharide gum seems unusual and requires further investigation to understand its nature, but it is clear that through this association the perfluorinated co-oligomer imparts both oleophobicity and hydrophobicity to the membrane-forming polysaccharide gums. This oleophobic and hydrophobic characteristics of the membrane would repel water-miscible polar solvents such as isopropanol and acetone and minimize the solvent contamination of the foam. This in turn leads to an improved foam stability and hence better fire fighting performance for the instant compositions.

TABLE VII

Effect of Perfluoronated Co-oligomers in Polar-solvent Composition (ARFC-1) on Fire Test in 6% Salt Water Premix on Isopropanol[a]

| Sample | CT (90%) | XT | BB (5 min) | FXR/QDT |
|---|---|---|---|---|
| Blank | 2:20 | 4:16 | 1 $ft^2$ | 4.9/27:25 |
| with homo-oligomer[b] (@ 0.42%) | 2:05 | 4:16 | 1 $ft^2$ | 4.8/19:06 |
| with co-oligomer: | | | | |
| Example #4 (@ 0.43%) | 1:19 | 2:57 | 3/4 $ft^2$ | 5.8/24:00 |
| Example #1 (@ 0.92%) | 1:49 | 3:30 | 1/2 $ft^2$ | 4.9/23:32 |

[a]Fire test according to UL 162 (UL Type II/50 ft 2/4.5 GPM application rate). Abbreviations: CT (Control Time); XT (Extinguishment Time); BB (Burnback); FXR (Foam Expansion Ratio); QDT (Quarter Drain Time).
[b]A homo-oligomer as described in U.S. Pat. No. 4,460,480 and 4,859,349.

TABLE VIII

Effect of Perfluorinated Co-oligomers in Polar-solvent Composition (ARFC-1) on Fire Test in 6% Salt Water Premix on Acetone[a]

| Sample | | CT (90%) | XT | BB (5 min) | FXR/ QDT |
|---|---|---|---|---|---|
| Blank | | 4:20 | none | not run | not run |
| with homo-oligomer[b] | | 1:45 | 5:13 | 5 $ft^2$ | 4.5/19:17 |
| with co-oligomers of: | | | | | |
| Example 4 | (0.43%) | 1:20 | 4:35 | 1/2 $ft^2$ | 6.0/22:00 |
| Example 4 | (0.86%) | 1:00 | 3:14 | 1 $ft^2$ | 5.2/17:00 |
| Example 1 | (0.92%) | 1:04 | 4:04 | self-extinguished | not run |

[a]Fire test according to UL-162 (UL Type II/50 $ft^2$ pan/4.5 GPM application rate/5 min application). Abbreviations: CT (Control Time); XT (Extinguishment Time); BB (Burnback); FXR (Foam Expansion Ratio); QDT (Quarter Drain Time).
[b]A homo-oligomer such as described in U.S. Pat. No. 4,460,480 and 4,859,349.

TABLE IX

Effect of Perfluorinated Co-oligomers on the Fire-fighting Performance of Protein-based Alcohol Resistant Film Forming Fluoroprotein Concentrates (AR-FFFP) in 6% Fresh Water Premix (Modified UL-162 Test Results on Acetone)

Fire test configuration:
1 min preburn/36 $ft^2$ square pan/4 GPM/5 min application

| Formulation[a] | CT (90%) | XT | BB (5 min) | FXR/QDT |
|---|---|---|---|---|
| AR-FFFP1 | 3:30 | 5:10 | note | 4.5/13:25 |
| Note: Corner started to collapse @ 9:30 into waiting/Immediate flash over and 80% burning when BB sleeve was removed @ 3 min. | | | | |
| AR-FFFP1 with co-oligomer of Example 3 (@ 0.84%) | 1:25 | 4:00* | 5 $in^2$ | 5.0/13:15 |

Note: Passed both torch/touch test/*few candles lasted 20 sec. BB flame was almost self-extinguished when sleeve was out.
[a]Both formulations (with and without the co-oligomer) contain the same amount of fluorine (% F). Abbreviations: CT (Control Time); XT (Extinguishment Time); BB (Burnback); FXR (Foam Expansion Ratio); QDT (Quarter Drain Time).

TABLE X

Effect of Perfluorinated Co-oligomers on the Fire-fighting Performance of Protein-based Alcohol Resistant Film Forming Fluoroprotein Concentrates (AR-FFFP) in 6% Fresh Water Premix (Modified UL-162 Test Results on Isopropanol)

Fire test configuration: 1 min preburn/36 $ft^2$ square pan/4 GPM/4 min application/Fresh water.

| Formulation[a] | CT (90%) | XT | BB (5 min) | FXR/QDT |
|---|---|---|---|---|
| AR-FFFP1 | 2:20 | 3:34 | 10 $ft^2$ | 4.5/13:25 |
| Note: Corner started to collapse @ BB time. | | | | |
| AR-FFFP1 with co-oligomer of Example 3 (@ 0.84%) | 1:10 | 2:48 | self-extinguished | 5.0/13:15 |
| Note: Passed both torch/touch test. | | | | |

Abbreviations: CT (Control Time); XT (Extinguishment Time); BB (Burnback); FXR (Foam Expansion Ratio); QDT (Quarter Drain Time).

TABLE XI

Association between Perfluorinated Co-oligomers and Polysaccharide Gums

| Solvent | Polar-solvent Insolubles in ARFC-1[a] (%) Blank | with Co-oligomer |
|---|---|---|
| Isopropanol | 1.09 | 1.39 |
| Acetone | 1.07 | 1.38 |

[a]ARFC-1 containing 0.42% co-oligomer of Example 3.

What is claimed is:

1. A composition effective for fighting hydrophilic or polar liquid fires which comprises (a) an effective amount of a perfluoroalkyl co-oligomer of formula I $R_f—E_m—(S)_n—[M_1]_x—[M_2]_y—H$ (I) or a mixture thereof wherein $R_f$ is a straight or branched chain perfluoroalkyl of 1 to 20 carbon atoms;

E is a direct bond or a branched or straight chain alkylene of 2 to 20 carbon atoms or said alkylene interrupted by one to three moieties selected from the group consisting of —NR—, —O—, —S—, $SO_2$—, —COO—, —OOC—, —CONR—, —NRCO—, —$SO_2$NR—, and —$NRSO_2$—; or terminated at the $R_f$ end with —CONR— or —$SO_2$NR—, that is the $R_f$ is attached to the carbon or sulfur atom;

R is independently hydrogen, alkyl of 1 to 6 carbon atoms or hydroxyalkyl of 2 to 6 carbon atoms;

m and n are independently 0 or 1;

—$[M_1]$— represents a non-ionic hydrophilic monomer unit;

—$[M_2]$— represents an anionic-hydrophilic monomer unit; and x and y represent the number of monomer units present in the co-oligomers and are both greater than 0; the sum of x and y being between 5 and 200, and $y/(x+y)$ being between 0.01 and 0.98; and (b) an effective amount of an anionic polysaccharide.

2. A composition according to claim 1 where in the co-oligomer of formula I $R_f$ is a linear or branched perfluoroalkyl group with 6 to 20 carbon atoms, E is alkylene of 2 to 6 carbon atoms, m is 0 or 1, n is 0 or 1;

—$[M_1]$— is $[CH_2CT_1R_1]$—, —$[CH_2CHT_2]$— or —$[CHT_3CHT_4]$— wherein $T_1$ is —$CONH_2$; —$CONHR_2$; —$CONHR_3$; —$CONHCH_2OH$; —$CONHCH_2OR_2$; $CONHE_2OH$; —$CO(OE_1)_qOR_1$; —$COOCH_2CHOHCH_2OH$; —CONH—$E_2$—$SO_3Z$; or —$CON(E_1OH)_2$;

$T_2$ is —OH; —$OE_2OR_1$; —$(OE_1)_qOR_1$; —$SO_3Z$; —$C_6H_4SO_3Z$; 2-oxo-pyrrolino; or —$NHCOR_1$;

$T_3$ and $T_4$ are independently —COOZ; —$CONH_2$; —$CO(OE_1)_qOR_1$; —CONH—$E_1$—OH; or —$CON(E_1$—$OH)_2$;

$R_1$ is hydrogen or methyl;

$R_2$ and $R_3$ are independently alkyl with 1 to 6 carbon atoms;

$E_1$ is alkylene with 2 or 3 carbon atoms;

$E_2$ is alkylene with 2 to 6 carbon atoms;

Z is hydrogen or an alkali metal;

q is 1 to 20;

—$[M_2]$— is —$[CH_2CR_1G_1]$— or —$[CHG_2CHG_3]$— wherein $G_1$ is —COOH, $E_2$—$SO_3H$ or $E_2PO_3H_2$;

$G_2$ and $G_3$ are independently alkylene with 1 to 6 carbon atoms terminated by —COOH;

$R_1$ is as previously defined;

the sum of $(x+y)$ is 5 to 200;

$y/(x+y)$ is 0.01 to 0.98;

x is 4 to 198; and y is 1 to 196.

3. A composition according to claim 1 where in the co-oligomer of formula I $R_f$ is a linear alkyl with 8 to 20 carbon atoms;

E is ethylene;

—$[M_1]$— is —$[CH_2CT_1R_1]$—, —$[CH_2CHT_2]$— or —$[CHT_3CHT_4]$— wherein $T_1$ is —$CONH_2$; $CONHR_2$; —$CONHR_3$; —$CONHCH_2OH$; —$CONHCH_2OR_2$; —$CONHE_2OH$; —$COOCH_2CHOHCH_2OH$; —CONH—$E_2$—$SO_3Z$; —$CO(OE_1)_qOR_1$; or —$COOCH_2CHOHCH_2OH$;

$T_3$ is —OH; —$OE_2OR_1$; —$(OE_1)_qOR_1$; —$SO_3Z$; —$C_6H_4SO_3Z$; 2-oxo-pyrrolino; or —$NHCOR_1$;

$T_3$ and $T_4$ are independently —COOZ; —$CONH_2$; —$CO(OE_1)_qOR_1$; —CONH—$E_1$—OH; or —$CON(E_1$—$OH)_2$;

—$[M_2]$— is —$[CH_2CR_1G_1]$— or —$[CHG_2CHG_3]$— wherein $G_1$ is —COOH, —$E_2$—$SO_3H$ or $E_2$—$PO_3H_2$;

$G_3$ and $G_3$ are independently alkylene with 1 to 6 carbons terminated by —COOH;

m, n, $R_1$, $R_2$, $R_3$, $E_1$, $E_2$, Z and q are as defined in claim 1;

the sum of $x+y$ is 13 to 100;

$y/(x+y)$ is 0.05 to 0.9;

x is 10 to 95; and y is 3 to 90.

4. A composition according to claim 1 where in the co-oligomer of formula I $R_f$ is a linear perfluoroalkyl of 8 to 20 carbon atoms;

the sum of $x+y$ is 28 to 75;

$y/(x+y)$ is 0.1 to 0.5;

x is 25 to 68;

y is 3 to 35;

E is ethylene;

m and n are 0 or 1;

—$[M_1]$— is —$[CH_2CT_1R_1]$—, —$[CH_2CHT_2]$— or —$[CHT_3CHT_4]$— wherein $T_1$ is —$CONH_2$; —$CONHR_2$; —$CONHR_3$; —$CONHCH_2OR_2$; —$CONHE_2OH$; —$COOCH_2CHOHCH_2OH$; —$CO(OE_1)_qOR_1$ or —$COOCH_2CHOHCH_2OH$;

—$[M_2]$— is —$[CH_2CR_1G_1]$— or —$[CHG_2CHG_3]$— wherein $G_1$ is —COOH or —$E_2$—$SO_3H$;

$G_2$ and $G_3$ are independently alkylene with 1 to 6 carbons terminated by —COOH; and $T_2$, $T_3$, $T_4$, $R_1$, $R_2$, $R_3$, $E_1$, $E_2$, Z and q are as defined in claim 1.

5. A composition according to claim 1 where in the co-oligomer of formula I $R_f$ is perfluoroalkyl of 6 to 20 carbon atoms, E is ethylene, m and n are each 1, —$[M_1]$— is —$[CH_2CHT_1]$— where $T_1$ is —$CONH_2$, —$[M_2]$— is —$[CH_2CHG_1]$— where $G_1$ is —COOH, $x+y$ is 21 to 44, and $y/(x+y)$ is 0.2 to 0.3.

6. A composition according to claim 1 which additionally contains aqueous fire fighting foam adjuvants.

7. A method of extinguishing a hydrophilic or polar liquid fire which comprises applying to the surface of said liquid an effective amount of a composition according to claim 1 for extinguishing said fire.

8. A composition according to claim 1 which additionally contains (c) an effective amount of a fluoroprotein (AR-FFFP) composition.

9. A method of extinguishing a hydrophilic or polar liquid fire which comprises applying to the surface of said liquid an effective amount of a composition according to claim 8 for extinguishing said fire.

10. A composition according to claim 1 which additionally contains (d amount of a synthetic polymer selected from the group consisting of polyureas, polyacetates, polyalcohols, polyethers, polyurethanes, polyacetals, polyamides, polyesters, polyetherketones, polyimides and mixtures thereof.

11. A composition according to claim 10 wherein component (d) is poly(vinyl alcohol) or hydroxyethyl cellulose.

12. A method of extinguishing a hydrophilic or polar liquid fire which comprises applying to the surface of said liquid an effective amount of a composition according to claim 10 for extinguishing said fire.

* * * * *